United States Patent
Wan (10) Patent No.: US 11,713,191 B2
(45) Date of Patent: Aug. 1, 2023

(54) ROBOT-BASED RANDOM WAREHOUSING METHOD AND APPARATUS, ELECTRONIC DEVICE, AND STORAGE MEDIUM

(71) Applicant: SYRIUS ROBOTICS CO., LTD., Guangdong (CN)

(72) Inventor: Qi Wan, Guangdong (CN)

(73) Assignee: SYRIUS ROBOTICS CO., LTD., Guangdong (CN)

( * ) Notice: Subject to any disclaimer, the term of this patent is extended or adjusted under 35 U.S.C. 154(b) by 72 days.

(21) Appl. No.: 17/293,932

(22) PCT Filed: Dec. 29, 2018

(86) PCT No.: PCT/CN2018/125121
§ 371 (c)(1),
(2) Date: May 14, 2021

(87) PCT Pub. No.: WO2020/103295
PCT Pub. Date: May 28, 2020

(65) Prior Publication Data
US 2022/0009711 A1 Jan. 13, 2022

(30) Foreign Application Priority Data
Nov. 19, 2018 (CN) .......................... 201811371578.2

(51) Int. Cl.
*B65G 1/04* (2006.01)
*B65G 1/137* (2006.01)
(Continued)

(52) U.S. Cl.
CPC ......... *B65G 1/0485* (2013.01); *B65G 1/0492* (2013.01); *B65G 1/1371* (2013.01);
(Continued)

(58) Field of Classification Search
CPC .. B65G 1/0485; B65G 1/0492; B65G 1/1371; B65G 1/1375; B65G 2203/0216;
(Continued)

(56) References Cited

U.S. PATENT DOCUMENTS 9,488,984 B1 * 11/2016 Williams ............. G05D 1/0274
2004/0093116 A1 * 5/2004 Mountz ................ G05D 1/0274
700/216
(Continued)

FOREIGN PATENT DOCUMENTS

CN 105858045 A 8/2016
CN 107291083 A 10/2017
(Continued)

OTHER PUBLICATIONS

Shan, Guyuan, Modern Logistics Management, Benefits of Automated Warehouse, Aug. 31, 2003, p. 189.
(Continued)

*Primary Examiner* — Thomas Randazzo
(74) *Attorney, Agent, or Firm* — Yu Gang (57) ABSTRACT

Provided are a robot-based random warehousing method and apparatus, an electronic device, and a storage medium. In the method, randomly allocated goods position information is acquired, and a shelving robot is controlled according to the goods position information to carry goods to goods position corresponding to the randomly allocated goods position information; a prompt is given to a picker to prompt the picker to take the goods from the shelving robot and place the goods at the goods position, and goods information and goods position information of the goods are synchronized to an unshelving order; and order information of the unshelving order is acquired and a picking robot in the vicinity of the goods position is controlled to move to the goods
(Continued)

position to instruct a picker to pick the goods at the goods position and pass the goods to the picking robot.

12 Claims, 6 Drawing Sheets

(51) Int. Cl.
| | | |
|---|---|---|
| *G05B 19/418* | (2006.01) | |
| *G06K 7/10* | (2006.01) | |
| *G06Q 50/28* | (2012.01) | |
| *G08B 7/06* | (2006.01) | |
| *G01C 21/00* | (2006.01) | |
| *G06Q 10/0631* | (2023.01) | |

(52) U.S. Cl.
CPC ....... *B65G 1/1375* (2013.01); *G01C 21/3804* (2020.08); *G05B 19/4189* (2013.01); *G06K 7/10861* (2013.01); *G06Q 10/06311* (2013.01); *G06Q 10/06315* (2013.01); *G06Q 50/28* (2013.01); *G08B 7/06* (2013.01); *B65G 2203/0216* (2013.01); *G05B 2219/32037* (2013.01); *G05B 2219/39001* (2013.01); *G06K 2007/10504* (2013.01)

(58) Field of Classification Search
CPC .............. B65G 1/1373; B65G 2209/04; G01C 21/3804; G05B 19/4189; G05B 2219/32037; G05B 2219/39001; G06K 7/10861; G06K 2007/10504; G06Q 10/06311; G06Q 10/06315; G06Q 50/28; G06Q 10/087; G08B 7/06
See application file for complete search history.

(56) References Cited

U.S. PATENT DOCUMENTS

| | | | |
|---|---|---|---|
| 2011/0054668 A1* | 3/2011 | Holmes | G07F 17/0092 |
| | | | 221/210 |
| 2012/0029687 A1 | 2/2012 | Hagen et al. | |
| 2013/0317642 A1* | 11/2013 | Asaria | G06Q 10/08 |
| | | | 700/216 |
| 2015/0239685 A1* | 8/2015 | Han | G06Q 10/06 |
| | | | 700/215 |
| 2015/0262118 A1* | 9/2015 | Grissom | G06Q 10/08 |
| | | | 700/214 |
| 2016/0236867 A1 | 8/2016 | Brazeau et al. | |
| 2017/0032256 A1 | 2/2017 | Otto et al. | |
| 2017/0278047 A1* | 9/2017 | Welty | G05D 1/0011 |
| 2017/0337506 A1* | 11/2017 | Wise | B65G 67/04 |
| 2018/0043535 A1 | 2/2018 | Stiernagle et al. | |
| 2018/0201444 A1* | 7/2018 | Welty | G06Q 50/28 |
| 2019/0220804 A1* | 7/2019 | Musunuri | B65G 1/10 |
| 2019/0236528 A1* | 8/2019 | Brooks | G06Q 10/06315 |
| 2019/0243358 A1* | 8/2019 | Jaquez | G05D 1/0088 |
| 2019/0389657 A1* | 12/2019 | Bonner | B65G 1/1373 |
| 2020/0250610 A1* | 8/2020 | Schoening | G06K 7/10475 |
| 2021/0147146 A1* | 5/2021 | Conrad | B65G 1/0492 |

FOREIGN PATENT DOCUMENTS

| | | |
|---|---|---|
| CN | 107516142 A | 12/2017 |
| CN | 107621824 A | 1/2018 |
| CN | 108100548 A | 6/2018 |
| CN | 207551088 U | 6/2018 |
| CN | 108328198 A | 7/2018 |
| CN | 108584274 A | 9/2018 |
| CN | 108792394 A | 11/2018 |
| JP | 2001048322 A | 2/2001 |
| JP | 2005067876 A | 3/2005 |
| JP | 20040189468 A | 1/2006 |
| JP | 5425425 B2 | 2/2014 |
| JP | 5811040 B2 | 11/2015 |
| WO | 2018168060 A1 | 9/2018 |

OTHER PUBLICATIONS

Hans-Chiristian Pfohl, Logistiksysteme, location allocation, Mar. 30, 2009, p. 102-103.
Hai, Feng et al. The Planning, Designing and Management of Logistics Park, Classification and methods of picking operations, p. 114.

\* cited by examiner

Fig. 1

Acqurie randomly allocated goods position information, and control, according to the goods position information, a shelving robot to carry goods to a goods position corresponding to the randomly allocated goods position information ⎯ S10

Give a prompt to a picker in the vicinity of the goods position, and synchronize goods information and goods position information of the goods to an unshelving order, wherein the prompt is used for prompting the picker in the vicinity of the goods position to take the goods and place the goods at the goods position ⎯ S11

Acquire order information of the unshelving order and control a picking robot in the vicinity of the goods position to move to the goods position to instruct a picker in the vicinity of the goods position to pick the goods at the goods position and pass the goods to the picking robot ⎯ S12

ROBOT-BASED RANDOM WAREHOUSING METHOD AND APPARATUS, ELECTRONIC DEVICE, AND STORAGE MEDIUM

CROSS REFERENCE

This application is a National Stage Filing of the PCT International Application No. PCT/CN2018/125121 filed on Dec. 29, 2018, which claims priority to Chinese Application No. 201811371578.2 filed on Nov. 19, 2018, the entirety of which is herein incorporated by reference.

TECHNICAL FIELD

The present disclosure belongs to the technical field of logistics robots, and particularly to a robot-based random warehousing method and apparatus, an electronic device, and a storage medium.

BACKGROUND

A random storage technology, as a warehousing technology, emphasizes that positions allocated to store goods are generated randomly, and therefore the positions often change and are not fixed. Briefly, any goods can be stored at any available positions.

In a random storage background, storage personnel usually store goods according to habits, and usually store goods at storage positions at entrances and exits as according to warehousing time of the goods, to achieve purposes of bringing conveniences to the storage personnel and increasing a utilization rate of a warehousing space.

The purposes of bringing conveniences to storage personnel and increasing the utilization rate of the warehousing space can be achieved by the random storage technology. However, random shelving of goods makes it complex to pick goods, namely random shelving of goods causes disordered placement of goods to be unshelved that pickers look for, and therefore increases difficulties in picking and travel time for transferring unshelved goods to packaging regions, resulting in reduction of the warehousing efficiency. Particularly, for a limited warehousing, space, a requirement on a utilization rate of the warehousing space is higher, so that the goods delivery efficiency is low, and it is unlikely to meet requirements of users expecting to get goods in short time in an electronic commerce environment.

In summary, the random storage technology in the related art has the following technical problem: lack of connection of shelving and picking reduces the warehousing efficiency.

SUMMARY

In view of the above, embodiments of the present disclosure provide a robot-based random warehousing method and apparatus, an electronic device, and a storage medium, which may solve the technical problem in the random storage technology in the related art that lack of connection of shelving and picking reduces the warehousing efficiency.

In order to solve the above technical problem, some embodiments of the present disclosure provide a robot-based random warehousing method, which is described below.

The robot-based random warehousing method includes the following operations.

Randomly allocated goods position information is acquired, and a shelving robot is controlled according to the goods position information to carry goods to goods position corresponding to the randomly allocated goods position information.

A prompt is given to a picker in the vicinity of the goods position, and goods information and goods position information of the goods are synchronized to an unshelving order, wherein the prompt is used for prompting the picker in the vicinity of the goods position to take the goods from the shelving robot and place the goods at the goods position.

Order information of the unshelving order is acquired and a picking robot in the vicinity of the goods position is <controlled to move to the goods position to instruct a picker in the vicinity of the goods position to pick the goods at the goods position and pass the goods to the picking robot.

Some embodiments of the present disclosure provide an electronic device, which includes a memory and a processor. The memory stores a computer program, and the processor is configured to execute the computer program to implement any above mentioned method.

Some embodiments of the present disclosure provide a storage medium, which stores a computer program. The computer program, when being executed by a processor, is configured to implement any abovementioned method.

Some embodiments of the present disclosure provide a robot-based random warehousing apparatus, which includes:

a shelving carrying module, configured to acquire randomly allocated goods position information and control, according to the goods position information, a shelving robot to carry goods to goods position corresponding to the randomly allocated goods position information;

a prompting and synchronization module, configured to give a prompt to a picker in the vicinity of the goods position and synchronize goods information and goods position information of the goods to an unshelving order, wherein the prompt is used for prompting the picker in the vicinity of the goods position to take the goods from the shelving robot and place the goods at the goods position; and an unshelving instruction module, configured to acquire order information of the unshelving order and control a picking robot in the vicinity of the goods position to move to the goods position to instruct a picker in the vicinity of the goods position to pick the goods at the goods position and pass the goods to the picking robot.

According to the robot-based random warehousing method provided in the embodiments of the present disclosure, the randomly allocated goods position information is acquired, the shelving robot is controlled according to the goods position information to carry the goods to the corresponding, goods position, then a prompt used for prompting the picker in the vicinity of the goods position to take the goods from the shelving robot and place the goods at the goods position is given to the picker in the vicinity of the goods position, the goods, information, and goods position information of the goods are synchronized to the unshelving order, and the order information of the unshelving order is acquired and the picking robot in the vicinity of the goods position is controlled to move to the goods position to instruct a picker in the vicinity of the goods position to pick the goods at the goods position and pass the goods to the picking robot. In this manner, goods can be randomly shelved and placed, and the placed goods can also be connected with picking robots. Therefore, the goods shelving and placement efficiency is improved, the goods picking and unshelving efficiency is also improved, and a purpose of improving the overall logistics efficiency is achieved.

DETAILED DESCRIPTION OF THE EMBODIMENTS

In order to make the objectives, technical solutions and advantages of the present disclosure clearer, the following further describes the present disclosure in detail with reference to the drawings and embodiments. It should be understood that, in the descriptions of the present disclosure, unless otherwise clearly specified and limited, term "storage medium" can be various media capable of storing computer programs, such as a Read-Only Memory (ROM), a Random Access Memory (RAM), a magnetic disk, or an optical disk. Term "processor" can be a chip or circuit with a data processing function, such as a Complex Programmable Logic Device (CPLD), a Field-Programmable Gate Array (FPGA), a Microcontroller Unit (MCL), a Programmable Logic Controller (PLC), and a Central Processing Unit (CPU). Term "electronic device" can be any device with the data processing function and a storage function, and can usually include a fixed terminal and a mobile terminal. The fixed terminal is, for example, a desktop computer. The mobile terminal is, for example, a mobile phone, a PAD, and a mobile robot. In addition, the technical features involved in different implementations of the embodiments of the present disclosure described later can be combined with each other as long as they do not conflict with each other.

In the following, some exemplary embodiments are provided to facilitate the implementation by those having ordinary skill in the art. A robot system may be selected as an execution body to implement method operations in the exemplary embodiments. The robot system may execute the method operations in the exemplary embodiments to schedule a robot to complete goods shelving and unshelving in cooperation with related personnel in a random warehousing scenario.

Figure 1:
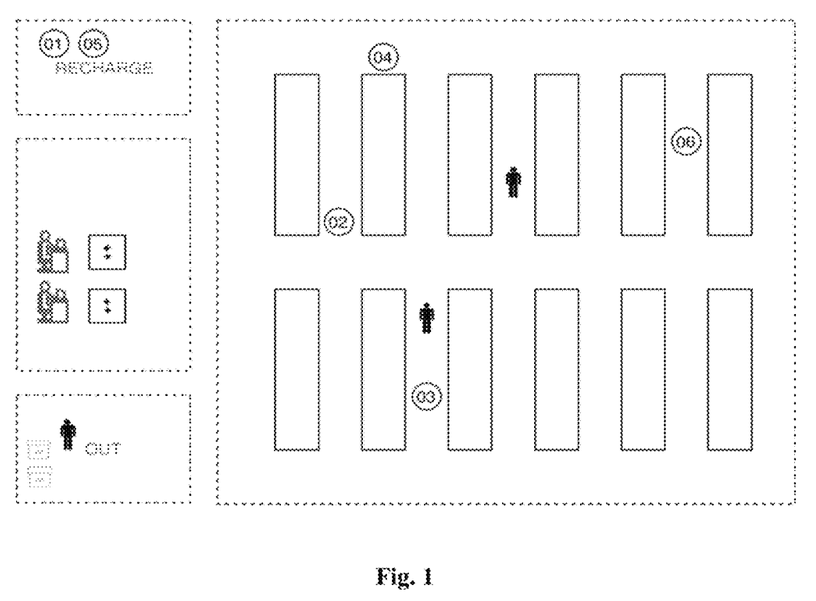
FIG. 1 is a schematic scenario diagram of a random warehousing scenario in a front warehouse.

FIG. 1 is a schematic scenario diagram of a random warehousing scenario in a front warehouse, and shows a random warehousing scenario.

Referring to FIG. 1, in the front warehouse, multiple employees can be arranged for picking, packaging and scheduling respectively. Meanwhile multiple robots are arranged for shelving and picking.

For example, five employees and six robots may be arranged to work in cooperation. Two employees are responsible for picking, two employees are responsible for packaging, and one employee is responsible for scheduling. In addition, four robots (such as 02, 03, 04, and 06) are responsible for picking, and two robots (such as 01 and 05) are responsible for shelving. During a practical working scenario, the pickers tour on standby in a picking region and wait for the robots, and the packagers wait for picked orders in a packaging region. Four robots can be allocated for picking, and two robots can be allocated for shelving.

Figure 2:
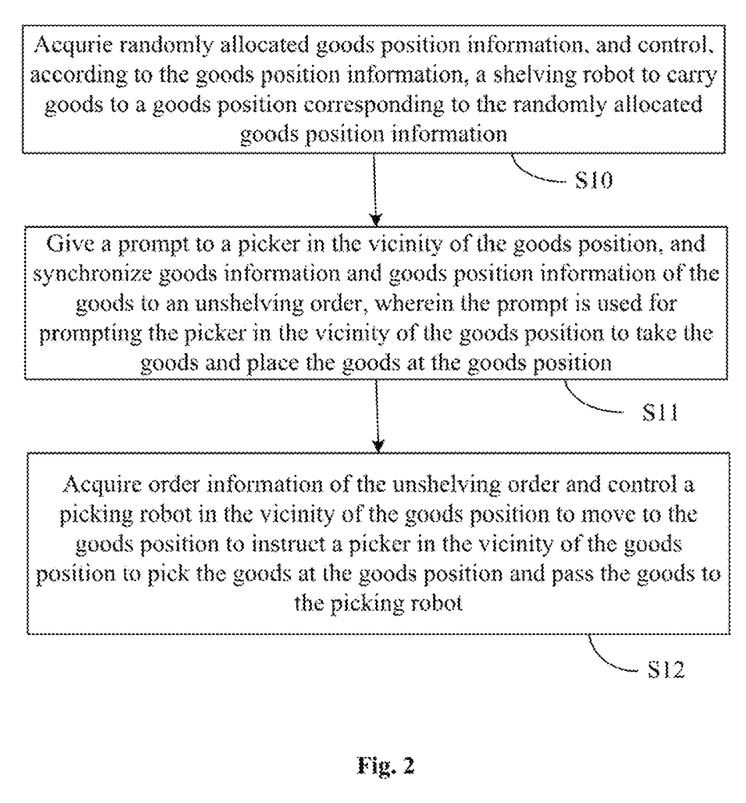
FIG. 2 is a flowchart of a robot-based random warehousing method according, to an embodiment.

FIG. 2 is a flowchart of a robot-based random warehousing method according, to an embodiment, and shows a robot-based random warehousing method.

Referring to FIG. 2, a robot-based random warehousing method includes operations S10 to S12.

In operation S10, randomly allocated goods position information is acquired, and a shelving robot is controlled according to the goods position information to carry goods to goods position corresponding to the randomly allocated goods position information.

In operation S11, a prompt is given to a picker in the vicinity of the goods position, and goods information and goods position information of the goods are synchronized to an unshelving order, wherein the prompt is used for prompting the picker in the vicinity of the goods position to take the goods from the shelving robot and place the goods at the goods position.

In operation S12, order information of the unshelving order is acquired and a picking robot in the vicinity of the goods position is controlled to move to the goods position to instruct a picker in the vicinity of the goods position to pick the goods at the goods position and pass the goods to the picking robot.

In the embodiment, the randomly allocated goods position information is acquired, the shelving robot is controlled according to the goods position information to carry the goods to the corresponding goods position, then a prompt used for prompting the picker in the vicinity of the goods position to take the goods from the shelving robot and place the goods at the goods position is given to the picker in the vicinity of the goods position, the goods information and goods position information of the goods are synchronized to the unshelving order, and the order information of the unshelving order is acquired and the picking robot in the vicinity of the goods position is controlled to move to the goods position to instruct the picker in the vicinity of the goods position to pick the goods at the goods position and pass the goods to the picking robot. In this manner, goods can be randomly shelved and placed, and the placed goods can also be connected with picking robots. Therefore, the goods shelving and placement efficiency is improved, the goods picking and unshelving efficiency is also improved, and a purpose of improving the overall logistics efficiency is achieved.

It is to be noted that, in operation S10, the goods position information is allocated through a warehouse management system. The warehouse management system allocates an order task to a robot system, the order task including goods position information and goods information of the goods.

The goods position information is randomly allocated and corresponds to any goods position of a goods shelf in a logistics warehouse (for example, a front warehouse). The goods information in the order task is correspondingly bound with the goods position information one to one once the goods position is allocated. In addition, before unshelving of the corresponding goods placed at the goods position, the warehouse management system keeps binding with the goods position.

After acquiring the randomly allocated goods position information, the robot system controls, according to the goods position information, the shelving robot to carry the goods to the corresponding goods position. The robot system can obtain a present position of the shelving robot in real time through a positioning technology to obtain position information of the shelving robot and then generate a warehouse navigation map according to the received goods position information to guide the shelving robot to carry the goods to the corresponding goods position.

Figure 10:
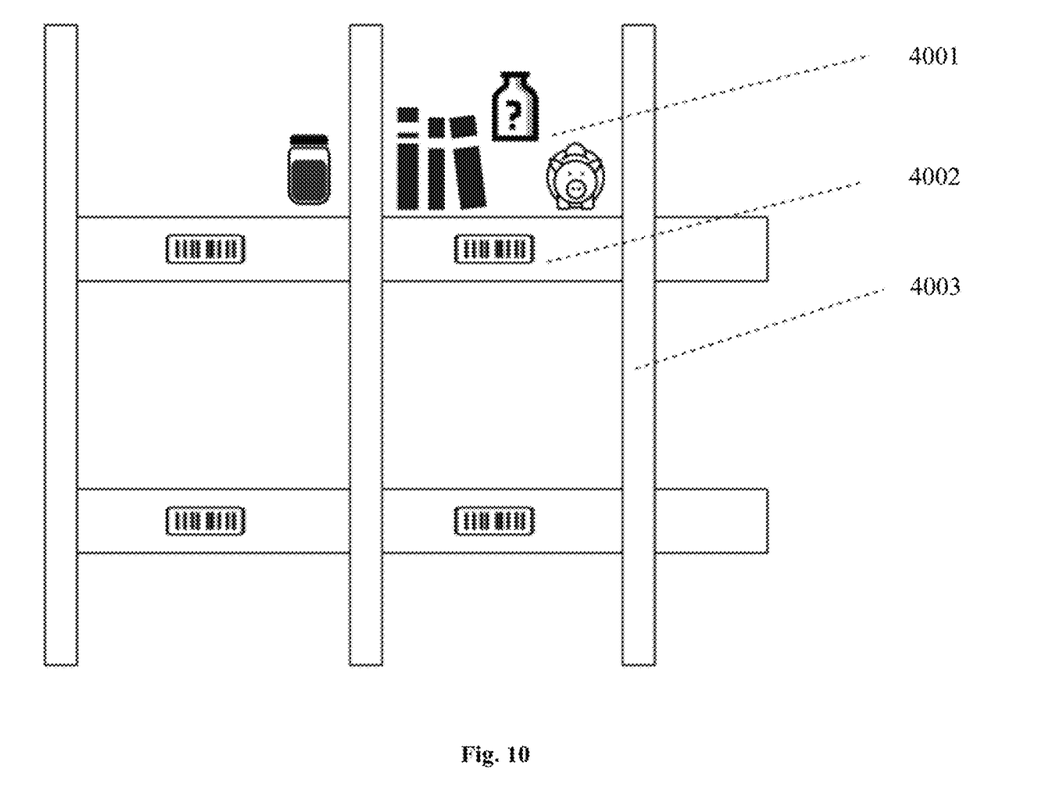
FIG. 10 is a structural diagram of a goods shelf in a front warehouse.
Figure 11:
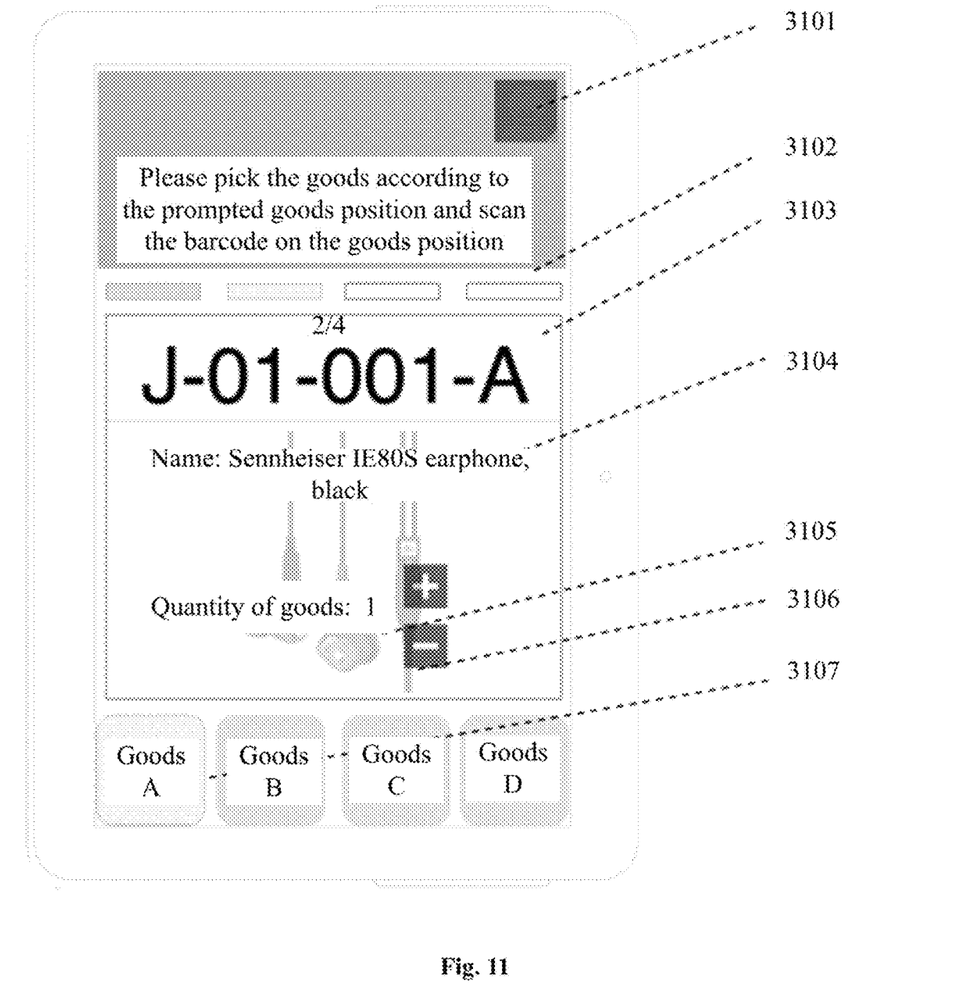
FIG. 11 is a scenario diagram of an interaction interface.

For example, referring to FIG. 10 and FIG. 11, the goods shelf in the front warehouse includes goods position identifiers 4002, a goods shelf body 4003 and, goods 4001 placed above the goods position identifiers 4002. The goods position identifier 4002 corresponds to goods position information 3103 of the goods, and the goods 4001 correspond to the goods information. The goods information includes, but is not limited to, name and image information 3104 and quantity information (the number of the goods) 3105.

It is to be noted that, in operation S11, when the shelving robot carries the goods to the corresponding goods position, the robot system controls the robot to send prompting information to prompt the picker in the vicinity of the goods position to take the goods from the shelving robot and place the goods at the goods position and synchronizes the goods information and goods position information of the goods to the unshelving order, thereby completing, a goods shelving task corresponding to the randomly allocated goods position. When the shelving task is completed, the picker can notify the robot system through a communication device such as an interaction terminal or code scanner on the robot, and the robot system synchronizes the goods information and goods position information of the goods to the unshelving order after being notified. The unshelving order is stored in the warehouse management system as an unshelving picking basis, and when unshelving picking is required, can be transmitted to the robot system, and then the robot system controls the picking robot for unshelving picking. Therefore, effective connection of goods shelving and unshelving is implemented, meanwhile, the shelving efficiency and the unshelving picking efficiency are improved, and moreover, the shelving robot and the picking robot can simultaneously implement goods delivering and shelving and goods picking and unshelving in the logistics warehouse to implement optimal resource configuration and greatly improve the warehousing efficiency.

For example, the operation that the prompt used for prompting the picker in the vicinity of the goods position to take the goods from the shelving robot and place the goods at the goods position is given to the picker in the vicinity of the goods position includes: a sound device of the shelving robot is controlled to produce a prompt tone or a light emitting device of the shelving robot is controlled to emit prompt light, wherein the prompt tone or the prompt light is used for prompting the picker in the vicinity of the goods position to take the goods from the shelving robot and place the goods at the goods position.

It is to be noted that, in operation S12, the robot system acquires the order information of the unshelving order and can generate the warehouse navigation map according to the goods position information in the unshelving order and present position information of the picking robot to guide the picking robot to move to the goods position and control an instruction device of the picking robot at the goods position to send an instruction signal to instruct the picker in the vicinity of the goods position to pick the goods at the goods position and pass the goods to the picking robot, thereby completing unshelving picking.

Figure 3:
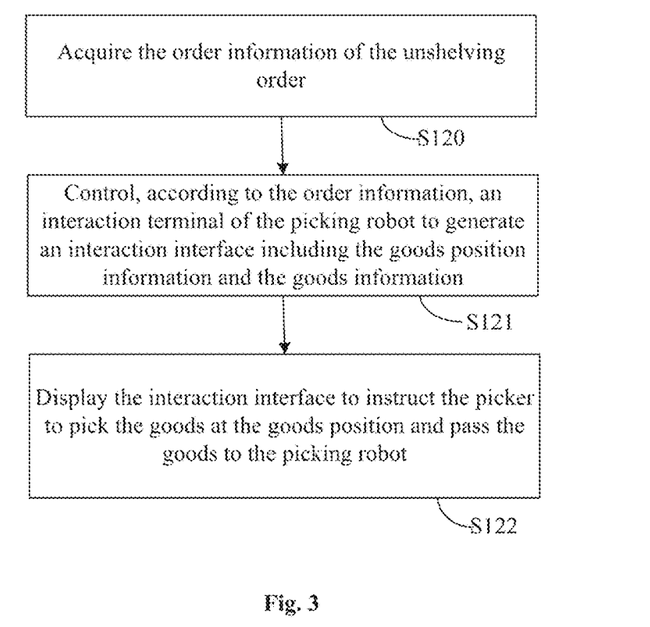
FIG. 3 is an exemplary method flowchart of operation S12 in FIG. 2.
Figure 12:
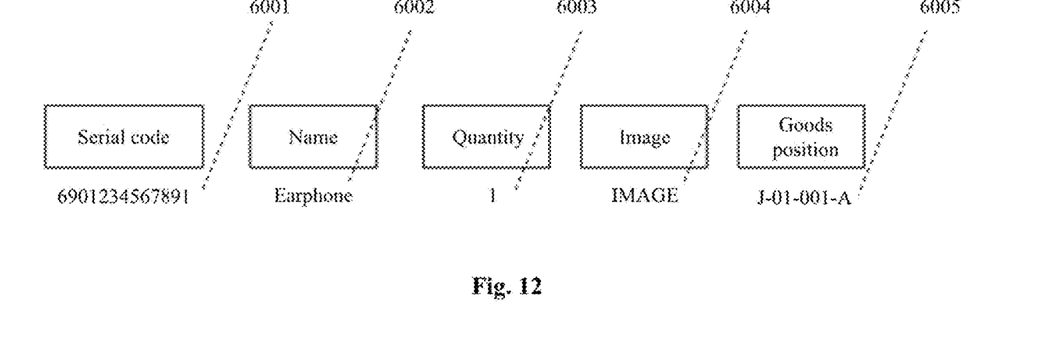
FIG. 12 is a display diagram of order information of an unshelving order.

For example, referring to FIG. 12, the order information of the unshelving order includes, but is not limited to, the goods position information (such as J-01-001-A) 6005 of the goods, image information (such as IMAGE) 6004, quantity information (the number of the goods, such as 1) 6003, name (such as earphone) 6002 and serial code information (such as 6901234567891), FIG. 3 is an exemplary method flowchart of operation S12 in FIG. 2, and shows a robot-based random warehousing method.

Referring to FIG. 3, an exemplary method of operation S12 includes operations S120 to S122.

In operation S120, the order information of the unshelving order is acquired.

In operation S121, an interaction terminal of the picking robot is controlled according to the order information to generate an interaction interface including the goods position information and the goods information.

In operation S122, the interaction interface is displayed to instruct the picker to pick the goods at the goods position and pass the goods to the picking robot.

In the embodiment, the order information of the unshelving order is acquired, then the interaction terminal of the picking robot is controlled according to the order information to generate the interaction interface including the goods position information and the goods information, and the interaction interface is controlled to be displayed to instruct the picker to pick the goods at the goods position and pass the goods to the picking robot, so that man-machine interaction is implemented, and the picker is clearly instructed to go to the specific goods position corresponding to the goods position information in the order information of the unshelving order to pick the goods at the goods position and pass the goods to the picking robot.

For example, referring to FIG. 11 and FIG. 12, the interaction interface includes, but is not limited to, goods position information 3103 of the goods (which corresponds to goods position information (such as J-01-001-A) 6002 of the goods), goods information, user information 3101, operation information 3102, goods type information 3107 and interface switching information 3106. The goods information includes, but is not limited to, name and image information 3104 corresponding to the name (such as earphone) 6002 and the image information (such as IMAGE) 6004, and the quantity information (the number of the goods) 3105 corresponding to the quantity information (the number of the goods, such as 1) 6003.

Figure 4:
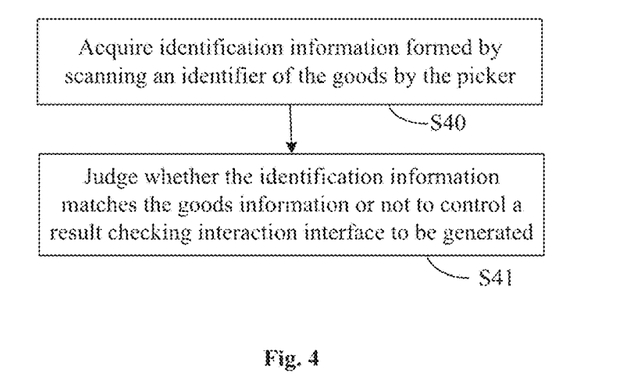
FIG. 4 is a flowchart of an improved method of the method in FIG. 3.

FIG. 4 is a flowchart of an improved method of the method in FIG. 3, and shows an improved method of a robot-based random warehousing method.

Referring to FIG. 4, the improved method of the method in FIG. 3 includes operations S40 and S41.

In operation S40, identification information formed by scanning an identifier of the goods by the picker is acquired.

In operation S41, it is judged whether the identification information matches the goods information or not to control a result checking interaction interface to be generated.

It is to be noted that the identification information formed by scanning the identifier of the goods by the picker is acquired and it is judged whether the identification information matches the goods information or not to control the result checking interaction interface to be generated, so that mistaken distribution of goods to picking robots can be avoided, and abnormal order information can also be statistically fed back to the warehouse management system.

Figure 5:
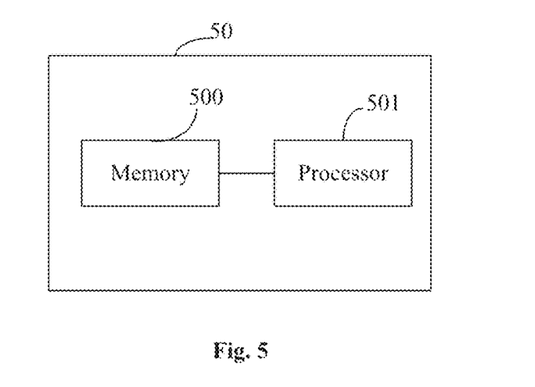
FIG. 5 is a structural diagram of, an electronic device according to an embodiment.

FIG. 5 is a structural diagram of an electronic device 50 according to an embodiment, which includes a memory 500 and a processor 501, wherein the memory 500 stores a computer program, and the processor 501 is configured to, execute the computer program to implement any method in FIG. 2 to FIG. 4.

In an exemplary embodiment, there is provided a storage medium, which stores a computer program, wherein the computer program, when being executed by a processor, is configured to implement any method, in FIG. 2 to FIG. 4.

Figure 6:
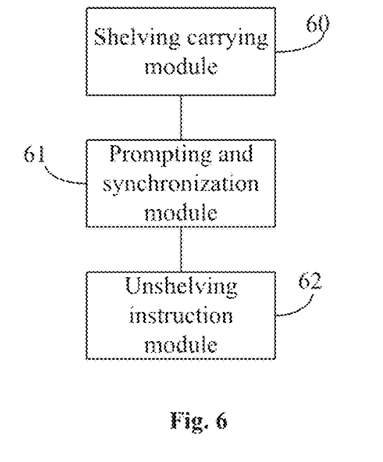
FIG. 6 is a structural diagram of a robot-based random warehousing apparatus according to an embodiment.

FIG. 6 is a structural diagram of a robot-based random warehousing apparatus according to an embodiment, and shows a robot-based random warehousing apparatus.

Referring to FIG. 6, a robot-based random warehousing apparatus includes:

a shelving carrying module 60, configured to acquire randomly allocated goods position information and control, according to the goods position information, a shelving robot to carry goods to goods position corresponding to the randomly allocated goods position information;

a prompting and synchronization module 61, configured to give a prompt to a picker in the vicinity of the goods position and synchronize goods information and goods position information of the goods to an unshelving order, wherein the prompt is used for prompting the picker in the vicinity of the goods position to take the goods from the shelving robot and place the goods at the goods position; and an unshelving instruction module 62, configured to acquire order information of the unshelving order and control a picking robot in the vicinity of the goods position to move to the goods position to instruct a picker in the vicinity of the goods position to pick the goods at the goods position and pass the goods to the picking robot.

In the embodiment, the randomly allocated goods position information is acquired, the shelving robot is controlled according to the goods position information to carry the goods to the corresponding goods position, then a prompt is given to the picker in the vicinity of the goods position, wherein the prompt is used for prompting the picker in the vicinity of the goods position to take the goods from the shelving robot and place the goods at the goods position, the goods information and goods position information of the goods are synchronized to the unshelving order, and the order information of the unshelving order is acquired and the picking robot in the vicinity of the goods position is controlled to move to the goods position to instruct the picker in the vicinity of the goods position to pick the goods at the goods position and pass the goods to the picking robot. In this manner, goods can be randomly shelved and placed, and the placed goods can also be connected with picking robots. Therefore, the goods shelving and placement efficiency is improved, the goods picking and unshelving efficiency is also improved, and a purpose of improving the overall logistics efficiency is achieved.

It is to be noted that the goods position information is allocated through a warehouse management system. The warehouse management system allocates an order task to a robot system, the order task including goods position information and goods information of the goods. The goods position information is randomly allocated and corresponds to any goods position of a goods shelf in a logistics warehouse (for example, a front warehouse). The goods information in the order task is correspondingly bound with the goods position information one to one once the goods position is allocated. In addition, before unshelving of the corresponding goods placed at the goods position, the warehouse management system keeps binding with the goods position.

After acquiring the randomly allocated goods position information, the robot system controls, according to the goods position information, the shelving robot to carry the goods to the corresponding goods position. The robot system can obtain a present position of the shelving robot in real time through a positioning technology to obtain position information of the shelving robot and then generate a warehouse navigation map according to the received goods position information to guide the shelving robot to carry the goods to the corresponding goods position.

For example, referring to FIG. 10 and FIG. 11, the goods shelf in the front warehouse includes goods position identifiers 4002, a goods shelf body 4003 and goods 4001 placed above the goods position identifiers 4002. The goods position identifier 4002 corresponds to goods position information 3103 of the goods, and the goods 4001 correspond to the goods information. The goods information includes, but is not limited to, name and image information 3104 and quantity information (the number of the goods) 3105.

It is to be noted that, when the shelving robot carries the goods to the corresponding goods position, the robot system controls the robot to send prompting information to prompt the picker in the vicinity of the goods position to take the goods from the shelving robot and place the goods at the goods position and synchronizes the goods information and goods position information of the goods to the unshelving order, thereby completing a goods shelving task corresponding to the randomly allocated goods position. When the shelving task is completed, the picker can notify the robot system through a communication device such as an interaction terminal or code scanner on the robot, and the robot system synchronizes the goods information and goods position information of the goods to the unshelving order after being notified. The unshelving order is stored in the warehouse management system as an unshelving picking basis, and when unshelving picking is required, can be transmitted to the robot system, and then the robot system controls the picking robot, for unshelving picking. Therefore, effective connection of goods shelving and unshelving is implemented, meanwhile, the shelving efficiency and the unshelving picking efficiency are improved, and moreover, the shelving robot and the picking robot can simultaneously implement goods delivering and shelving and goods picking and unshelving in the logistics warehouse to implement optimal resource configuration and greatly improve the warehousing efficiency.

For example, the operation that the prompt is given to the picker in the vicinity of the goods position, wherein the prompt is used for prompting the picker in the vicinity of the goods position to take the goods from the shelving robot and place the goods at the goods position, includes: a sound device of the shelving robot is controlled to produce a prompt tone or a light emitting device of the shelving robot is controlled to emit prompt light, wherein the prompt tone or the prompt light is used for prompting the picker in the vicinity of the goods position to take the goods from the shelving robot and place the goods, at the goods position.

It is to be noted that the robot system acquires the order information of the unshelving order and can generate the warehouse navigation map according to the goods position information in the unshelving order and present position information of the picking robot to guide the picking robot to move to the goods position and control an instruction device of the picking robot at the goods position to send an instruction signal to instruct the picker in the vicinity of the goods position to pick the goods at the goods position and pass the goods to the picking robot, thereby completing unshelving picking.

For example, referring to FIG. 12, the order information of the unshelving order includes, but is not limited to, the goods position information (such as J-01-001-A) 6005 of the goods, image information (such as IMAGE) 6004, quantity information (the number of the goods, such as 1) 6003, name (such as earphone) 6002 and serial code information (such, as 6901234567891) 6001.

Figure 7:
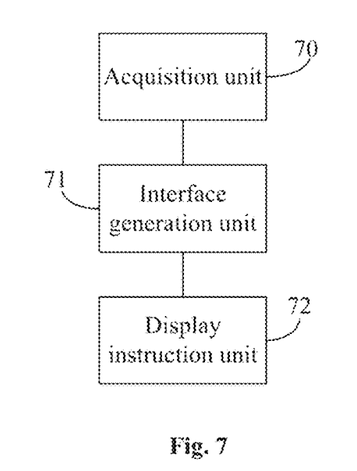
FIG. 7 is a structural diagram of an unshelving instruction module 62 in FIG. 6.

FIG. 7 is a structural diagram of the unshelving instruction module 62 in FIG. 6, and shows an unshelving instruction module of a robot-based random warehousing apparatus.

Referring to FIG. 7, the unshelving instruction module includes:

an acquisition unit 70, configured to acquire the order information of the unshelving order;

an interface generation unit 71, configured to control, according to the order information, an interaction terminal of the picking robot to generate an interaction interface including the goods position information and the goods information; and a display instruction unit 72, configured to display the interaction interface to instruct the picker to pick the goods at the goods position and pass the goods to the picking robot.

In the embodiment, the order information of the unshelving order is acquired, then the interaction terminal of the picking robot is controlled according to the order information to generate the interaction interface including the goods position information and the goods information, and the interaction interface is controlled to be displayed to instruct the picker to pick the goods at the goods position and pass the goods to the picking robot, so that man-machine interaction is implemented, and the picker is clearly instructed to go to the specific goods position corresponding to the goods position information in the order information of the unshelving order to pick the goods at the goods position and pass the goods to the picking robot.

For example, referring to FIG. 11 and FIG. 12, the interaction interface includes, but is not limited to, goods position information 3103 of the goods (which corresponds to goods position information (such as J-01-001-A) 6002 of the goods), goods information, user information 3101, operation information 3102, goods type information 3107 and interface switching information 3106. The goods information includes, but is not limited to, name and image information 3104 corresponding to the name (such as earphone) 6002 and the image information (such as IMAGE) 6004, and quantity information (the number of the goods) 3105 corresponding to the quantity information (the number of the goods, such as 1) 6003.

Figure 8:
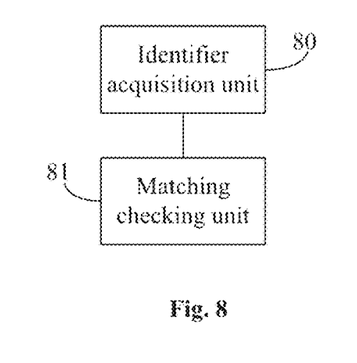
FIG. 8 is an improved structural diagram of an unshelving instruction module 62 in FIG. 7.

FIG. 8 is an improved structural diagram of the unshelving instruction module 62 in FIG. 7, and shows an improved unshelving instruction module of a robot-based random warehousing apparatus.

Referring to FIG. 8, the unshelving instruction module in FIG. 7 further includes:

an identifier acquisition module 80, configured to acquire identification information formed by scanning an identifier of the goods by the picker; and a matching checking unit 90, configured to judge whether the identification information matches the goods information or not to control a result checking interaction interface to be generated.

It is to be noted that the identification information formed by scanning the identifier of the goods by the picker is acquired and it is judged whether the identification information matches the goods information or not to control the result checking interaction interface to be generated, so that mistaken distribution of goods to picking robots can be avoided, and abnormal order information can also be statistically fed back to the warehouse management system.

Figure 9:
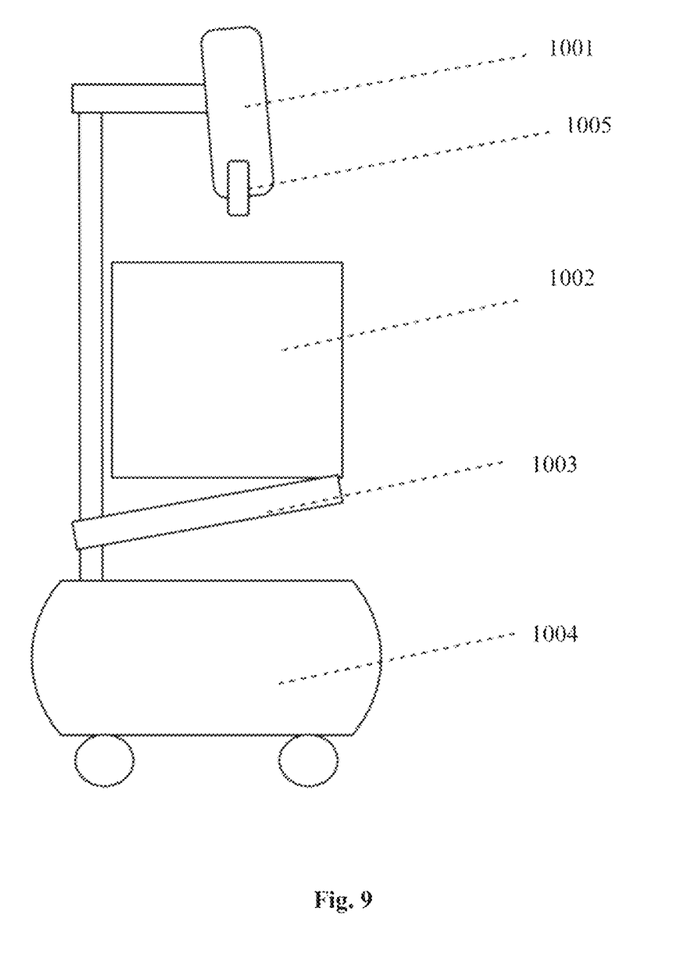
FIG. 9 is a structural diagram of a; robot involved in FIGS. 1 to 8.

FIG. 9 is a structural diagram of a robot involved in FIG. 1 to FIG. 8.

Referring to FIG. 9, a code scanner 1005, an interaction terminal 1001, a pallet 1003 and a moving base 1004 can be arranged on a body of the robot. The code scanner 1005 can be configured to scan an identifier and goods position identifier 4002 of goods. The pallet 1003 is configured to place a turnover box 1002.

The above descriptions are only the exemplary embodiments of the present disclosure and are not intended to limit the present disclosure. Any modification, equivalent replacement and improvement made within the principle of the present disclosure shall be included in the protection scope defined by the appended claims of the present disclosure.

INDUSTRIAL APPLICABILITY

According to the robot-based random warehousing method provided in the embodiments of the present disclosure, the randomly allocated goods position information is acquired, the shelving robot is controlled according to the goods position information to carry the goods to the corresponding goods position, then a prompt is given to the picker in the vicinity of the goods position, wherein the prompt is used for prompting the picker in the vicinity of the goods position to take the goods from the shelving robot and place the goods at the goods position, the goods information and goods position information of the goods are synchronized to the unshelving order, and the order information of the unshelving order is acquired and the picking robot in the vicinity of the goods position is controlled to move to the goods position to instruct a picker in the vicinity of the goods position to pick the goods at the goods position and pass the goods to the picking robot. In this manner, goods can be randomly shelved and placed, and the placed goods can also be connected with picking robots. Therefore, the goods shelving and placement efficiency is improved, the goods picking and unshelving efficiency is also improved, and a purpose of improving the overall logistics efficiency is achieved.

What is claimed is:

1. A robot-based random warehousing method, wherein the method is applied in a front warehouse in which multiple shelves, one or more shelving robots and one or more picking robots are arranged, wherein pickers tour on standby in a picking region between the multiple shelves and wait for the one or more shelving robots and the one or more picking robots, a shelf allocated to store goods and comprising multiple fixed goods positions each being identified by one goods position identifier is generated randomly, one goods position on the allocated shelf randomly stores multiple types of goods, and the method comprises:

acquiring, by a robot system, goods position information which is randomly allocated to the robot system through a warehouse management system and which corresponds to a goods position on the shelf, and controlling, by the robot system according to the goods position information, a shelving robot to carry goods to the goods position corresponding to the randomly allocated goods position information;

controlling, by the robot system, the shelving robot to give a prompt to a picker in the vicinity of the goods position to randomly shelve multiple types of goods at the goods position on the allocated shelf, wherein the prompt is used for prompting the picker in the vicinity of the goods position to take the goods from the shelving robot and place the goods at the goods position;

receiving, by the robot system, a notification sent by the picker through an interaction terminal or a code scanner on the shelving robot after the picker in the vicinity of the goods position completes taking the goods from the shelving robot and placing the goods at the goods position, and after receiving the notification about the completion of the shelving task, binding, by the robot system, goods information and goods position information of the goods and synchronizing, by the robot system, the goods information and the goods position information of the goods to an unshelving order; and acquiring, by the robot system, order information of the unshelving order and controlling, by the robot system, a picking robot in the vicinity of the goods position to move to the goods position to instruct a picker in the vicinity of the goods position to pick the goods at the goods position and pass the goods to the picking robot;

wherein controlling the shelving robot to give the prompt to the picker in the vicinity of the goods position, wherein the prompt is used for prompting the picker in the vicinity of the goods position to take the goods from the shelving robot and place the goods at the goods position, comprises:

controlling a sound device of the shelving robot to produce a prompt tone or controlling a light emitting device of the shelving robot to emit prompt light, wherein the prompt tone or the prompt light is used for prompting the picker in the vicinity of the goods position to take the goods from the shelving robot and place the goods at the goods position.

2. The method according to claim 1, wherein acquiring the order information of the unshelving order and controlling the picking robot in the vicinity of the goods position to move to the goods position to instruct the picker in the vicinity of the goods position to pick the goods at the goods position and pass the goods to the picking robot comprises:

acquiring the order information of the unshelving order;

controlling, according to the order information, the interaction terminal of the picking robot to generate an interaction interface comprising the goods position information and the goods information; and displaying the interaction interface to instruct the picker to pick the goods at the goods position and pass the goods to the picking robot.

3. The method according to claim 2, further comprising: acquiring identification information formed by scanning an identifier of the goods by the picker; and judging whether the identification information matches the goods information or not to control a result checking interaction interface to be generated.

4. An electronic device, comprising a memory and a processor, wherein the memory stores a computer program, and the processor is configured to execute the computer program to implement the method according to claim 2.

5. An electronic device, comprising a memory and a processor, wherein the memory stores a computer program, and the processor is configured to execute the computer program to implement the method according to claim 3.

6. A non-transitory computer-readable storage medium, storing a computer program, wherein the computer program, when being executed by a processor, is configured to implement the method according to claim 2.

7. A non-transitory computer-readable storage medium, storing a computer program, wherein the computer program, when being executed by a processor, is configured to implement the method according to claim 3.

8. An electronic device, comprising a memory and a processor, wherein the memory stores a computer program, and the processor is configured to execute the computer program to implement the method according to claim 1.

9. A non-transitory computer-readable storage medium, storing a computer program, wherein the computer program, when being executed by a processor, is configured to implement the method according to claim 1.

10. A robot-based random warehousing apparatus in a robot system, wherein the apparatus is applied in a front warehouse in which multiple shelves, one or more shelving robots and one or more picking robots are arranged, wherein pickers tour on standby in a picking region between the multiple shelves and wait for the one or more shelving robots and the one or more picking robots, a shelf allocated to store goods and comprising multiple fixed goods positions each being identified by one goods position identifier is generated randomly, one goods position on the allocated shelf randomly stores multiple types of goods, and the apparatus comprises a memory and a processor, wherein the memory stores a computer program, and the processor is configured to execute the computer program to:

acquire goods position information which is randomly allocated to the robot system through a warehouse management system and which corresponds to a goods position on the shelf and control, according to the goods position information, a shelving robot to carry goods to the goods position corresponding to the randomly allocated goods position information;

control the shelving robot to give a prompt to a picker in the vicinity of the goods position to randomly shelve multiple types of goods at the goods position on the allocated shelf, wherein the prompt is used for prompting the picker in the vicinity of the goods position to take the goods from the shelving robot and place the goods at the goods position;

receive a notification sent by the picker through an interaction terminal or a code scanner on the shelving robot after the picker in the vicinity of the goods position completes taking the goods from the shelving robot and placing the goods at the goods position, and after receiving the notification about the completion of the shelving task, bind goods information and goods position information of the goods and synchronize the goods information and the goods position information of the goods to an unshelving order; and acquire order information of the unshelving order and control a picking robot in the vicinity of the goods position to move to the goods position to instruct a picker in the vicinity of the goods position to pick the goods at the goods position and pass the goods to the picking robot;

wherein the processor, when being configured to control the shelving robot to give the prompt to the picker in the vicinity of the goods position, is configured to execute the computer program to, control a sound device of the shelving robot to produce a prompt tone, wherein the prompt tone is used for prompting the picker in the vicinity of the goods position to take the goods from the shelving robot and place the goods at the goods position; or control a light emitting device of the shelving robot to emit prompt light, wherein the prompt light is used for prompting the picker in the vicinity of the goods position to take the goods from the shelving robot and place the goods at the goods position.

11. The apparatus according to claim 10, wherein the processor, when being configured to acquire order information of the unshelving order and control a picking robot in the vicinity of the goods position to move to the goods position to instruct a picker in the vicinity of the goods position to pick the goods at the goods position and pass the goods to the picking robot, is configured to execute the computer program to:

control, according to the order information, the interaction terminal of the picking robot to generate an interaction interface comprising the goods position information and the goods information; and display the interaction interface to instruct the picker to pick the goods at the goods position and pass the goods to the picking robot.

12. The apparatus according to claim 11, wherein the processor is further configured to execute the computer program to:

acquire identification information formed by scanning an identifier of the goods by the picker; and judge whether the identification information matches the goods information or not to control a result checking interaction interface to be generated.

* * * * *